July 11, 1933.  T. M. RUSSELL  1,917,548
METHOD OF PRODUCING ENDLESS BELTS
Filed Jan. 10, 1930
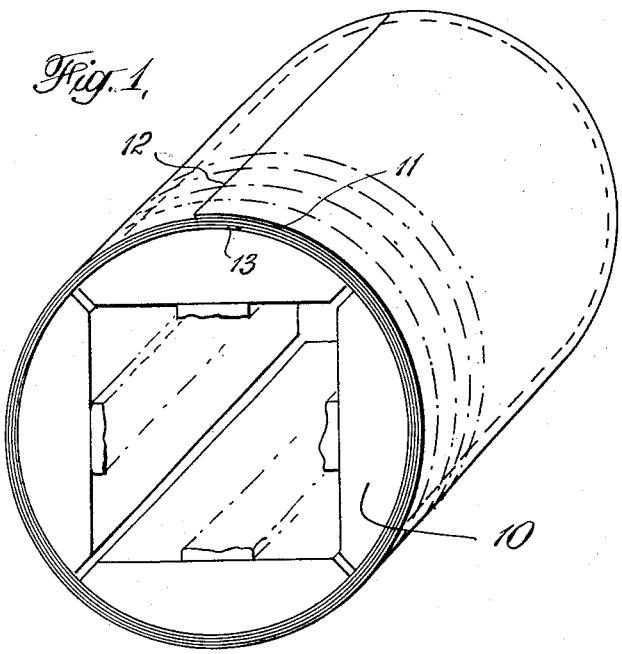
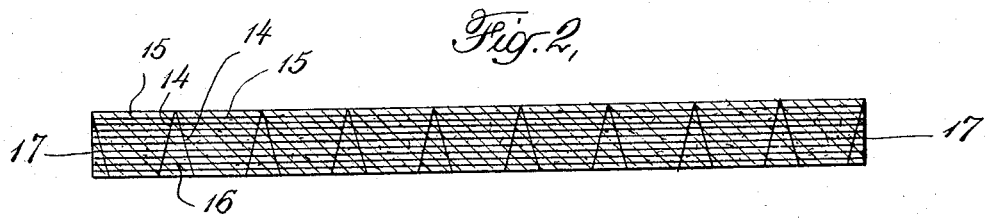
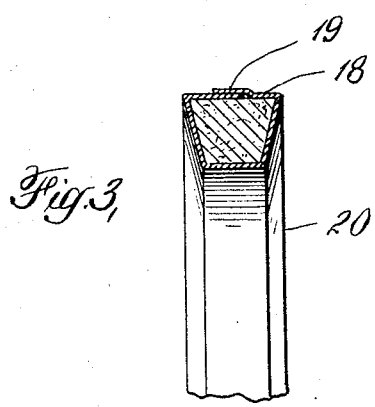
INVENTOR
Thomas M. Russell
BY
ATTORNEYS Patented July 11, 1933

1,917,548

UNITED STATES PATENT OFFICE

THOMAS M. RUSSELL, OF MIDDLETOWN, CONNECTICUT, ASSIGNOR TO THE RUSSELL MANUFACTURING COMPANY, OF MIDDLETOWN, CONNECTICUT, A CORPORATION OF CONNECTICUT

METHOD OF PRODUCING ENDLESS BELTS

Application filed January 10, 1930, Serial No. 419,858.

This invention relates to belting which consists of fabric impregnated with rubber compounds, and is concerned more particularly with a novel belting of a type especially adapted for use on automobiles for operating the fan, and with a method by which such belting of high quality may be produced rapidly and at a lost cost.

The belting of this invention is endless and it comprises a single length of fabric wound upon itself a number of times to produce a multi-ply ring in which each successive ply from inside to outside is slightly longer and wider than the one preceding it. The fabric is impregnated or frictioned with a suitable rubber compound before being subjected to the forming operation and the completed ring is wrapped, in some instances, within a cover layer of rubber. The belt is finished by a vulcanizing operation carried on by the action of heat and pressure, and the finished article is a closed ring of wedge shape cross-section having rubber on its surfaces and a continuous fabric reinforcement inside. The fabric used is cut straight with the weave, so that the warp threads run lengthwise of the belt and take the driving strain, and this strain is equally distributed throughout the several plies since their length increases with their distance from the inner face of the belt.

The novel method for making this belting includes the steps of winding a length of suitably treated fabric upon a form of a diameter sufficient to produce an endless belt of the desired length. The fabric is laid on the form to produce a multi-ply layer of the desired thickness and the layer is then subdivided into a plurality of individual belts of wedge shape cross-section by a series of circumferential cuts extending at an angle to the inner and outer faces of the layer. The individual belts so produced are then removed from the form, wrapped in the rubber covering, placed in molds and vulcanized.

For a better understanding of the invention, reference may be had to the accompanying drawing, in which Fig. 1 is a view in perspective illustrating a form of mandrel employed with the fabric wrapped thereon;

Fig. 2 is a sectional view through a layer made up of a plurality of plies of the fabric;

Fig. 3 is a view in perspective and partly in section illustrating one form of the completed belt;

Fig. 4 is a sectional view showing a modified form of belt produced by the method at one stage in its manufacture;

Fig. 5 is a sectional view of the completed belt of modified form; and

Fig. 6 is a sectional view similar to Fig. 2, showing a different method of building up the layer of belting material.

The fabric employed in the manufacture of belts in accordance with this invention is a stout material such as cotton duck and it is used in a width such as 36", which is suitable for the manufacture of a large number of individual belts. This fabric, in accordance with one embodiment of the method, is frictioned with a rubber compound, the rubber being forced into the interstices in the fabric by a well-known procedure. The fabric so treated is then wound upon a collapsible cylindrical mandrel 10 in expanded condition, the diameter of this mandrel expanded being equal to the inner diameter of the finished endless belts. The fabric is wound about the mandrel a plurality of times to build up a layer 11 of the desired thickness and number of plies, the fabric then being cut across so that the two ends 12 and 13 of the fabric slightly overlap.

The multi-ply layer of fabric is then cut circumferentially by knives or other cutting devices adjusted to produce cuts 14 which extend at an angle to the inner and outer faces of the layer. This cutting operation is carried on in such a manner that a plurality of wedge-shaped belts 15 are formed separated by triangular belts 16, the end units 17 also being triangular but of slightly different form.

After the completion of the winding and cutting operations, the mandrel is collapsed and the individual belts 15 removed therefrom. These belts may then be wrapped within a cover of unvulcanized rubber 18, a sheet of rubber being applied to the inner face of each belt and its ends wrapped around the sides and over the top to overlap as indicated at 19. The individual belts are then placed in molds and subjected to a standard vulcanizing treatment by heat and pressure. In this treatment the coating sheet 18 combines with the rubber frictioned into the fabric and forms an integral part of the belt.

The completed individual belts so formed are endless and the inner driving face 20 is of slightly less width than the outer face. A commercial form of such a belt, for example, may be ½" thick with an inner face ⅜" wide and an outer face ⅝" wide.

Instead of wrapping the units in the sheet 18 of unvulcanized rubber, satisfactory results may be obtained by using a frictioned material in which a greater amount of the rubber compound has been incorporated, or by coating one face of the fabric with a thin sheet 21 of the rubber compound, the fabric then being wound so that the coating lies on the outer face of the first ply 22. After a layer of this type of fabric has been built up to the desired thickness, it is cut as before into belts of the desired section and then subjected to heat and pressure which causes the rubber carried by the fabric or lying between the plies thereof to be squeezed out at the edges of the belt to form a rubber protective coating over all faces of the belt.

The belts 15 produced in the manner described are of best quality but the triangular units 16 remaining after the cutting operations may be shaped by pressure into a round belt 23 which is cheap and satisfactory for many purposes. The operations in the finishing of the belts 23 include the shaping of the triangular section to the round form, as described, the enclosure of the unit 23 in a layer of unvulcanized rubber if desired, and the final vulcanizing process.

In the flat belt produced in the manner described, the fabric used is cut straight with the weave, so that the straight warp threads extend lengthwise of the belt and bear the driving stresses to which the belt is subjected. By using fabric so cut, the belts produced do not have nearly so great a tendency to stretch as in the case of belts made of bias cut fabric. Also, the belts produced by my method include a plurality of plies of fabric, with the inmost ply shortest and the length of the plies increasing toward the outer face of the belt. In such a belt, the fabric is not subjected to varying stresses in different parts thereof and the tension on the various plies is equalized, whereas in belts made by present methods in which the length of the fabric is the same on both inside and outside, there is an undue tension placed on the outer layers of fabric and the inner layers may not be subjected to tension but to a compression. The outer layers of such belts carry most of the load and as the belt is distorted as it passes over pulleys, its life is greatly shortened.

What I claim:

1. The method of making belts, which comprises winding a continuous web of straight cut fabric into a tube made up of a plurality of plies, the warp threads of the fabric extending circumferentially of the tube, sub-dividing the one piece tube so formed, into a plurality of rings of trapezoidal and triangular section in alternation, wrapping each trapezoidal ring in sheet rubber, and vulcanizing said wrapped rings.

2. The method of making belts which comprises winding a continuous length of fabric impregnated with a rubber compound to form a tube made up of a plurality of plies, the warp threads of the fabric running circumferentially of the tube, sub-dividing the one piece tube so formed, into rings of trapezoidal and triangular section alternately, and vulcanizing the trapezoidal rings under heat and pressure.

3. The method of making belts which comprises winding a continuous length of fabric impregnated with rubber compound to form a tube made up of a plurality of plies, the warp threads of the fabric running circumferentially of the tube, sub-dividing the one piece tube so formed, into rings of trapezoidal and triangular section alternately, wrapping each trapezoidal ring in sheet rubber, and vulcanizing the wrapped rings under heat and pressure.

4. A method of making belts which comprises winding a length of straight cut fabric impregnated with rubber to form a tube made up of a plurality of plies, the warp threads of the fabric running circumferentially of the tube, sub-dividing the tube into a plurality of rings of trapezoidal and triangular section alternately, subjecting the triangular rings to pressure to alter the sectional shape thereof, and vulcanizing said rings.

5. A method of making belts which comprises wrapping a straight cut fabric impregnated with rubber a plurality of times about a form to build up a multi-ply layer, subdividing the layer by a plurality of circumferential cuts extending at an angle to both faces of the layer into a plurality of trapezoidal sections having their shorter bases on the inside face and a plurality of sections which are formed incidentally between the first mentioned sections, removing all of the sections from the form, vulcanizing the first mentioned sections and shaping and vulcanizing the remaining sections.

In testimony whereof I affix my signature.

THOMAS M. RUSSELL.